(12) United States Patent  (10) Patent No.: US 9,910,448 B2
Horwitz  (45) Date of Patent: Mar. 6, 2018

(54) PRESSURE-BASED GAS FLOW CONTROLLER WITH DYNAMIC SELF-CALIBRATION

(71) Applicant: Christopher Max Horwitz, Pittsburgh, PA (US)

(72) Inventor: Christopher Max Horwitz, Pittsburgh, PA (US)

(*) Notice: Subject to any disclaimer, the term of this patent is extended or adjusted under 35 U.S.C. 154(b) by 0 days.

(21) Appl. No.: 14/345,275

(22) PCT Filed: Mar. 14, 2014

(86) PCT No.: PCT/US2014/027698
§ 371 (c)(1),
(2) Date: Mar. 17, 2014

(87) PCT Pub. No.: WO2014/152755
PCT Pub. Date: Sep. 25, 2014

(65) Prior Publication Data
US 2016/0252912 A1    Sep. 1, 2016

Related U.S. Application Data

(60) Provisional application No. 61/785,235, filed on Mar. 14, 2013.

(51) Int. Cl.
*G01F 1/86* (2006.01)
*G01F 25/00* (2006.01)
(Continued)

(52) U.S. Cl.
CPC .......... *G05D 7/0635* (2013.01); *G01F 1/76* (2013.01); *G01F 1/86* (2013.01); *G01F 1/88* (2013.01); *G01F 25/0053* (2013.01)

(58) Field of Classification Search
CPC ... G01F 1/34; G01F 1/372; G01F 1/76; G01F 1/86; G01F 1/88
(Continued)

(56) References Cited

U.S. PATENT DOCUMENTS 4,285,245 A * 8/1981 Kennedy ............... G01F 3/38
 73/199
4,364,413 A   12/1982 Bersin
(Continued)

FOREIGN PATENT DOCUMENTS

WO    WO0073868 A1    12/2000
WO    PCTUS1427698 A2   8/2014
WO    WO2014152755 A1   9/2014

OTHER PUBLICATIONS

Understanding Absolute Pressure Sensors [Technical Note]. Freeport, IL: Honeywell, 2004. PDF.*
(Continued)

*Primary Examiner* — Mary McManmon
*Assistant Examiner* — Richard K Durden (57) ABSTRACT

A method of measuring a molecular rate of gas flow from an upstream source of gas at a pressure higher than a pressure of a destination includes flowing the gas through an upstream valve into a cavity of known volume, then through a restrictor element before proceeding to the destination, controlling the upstream valve to vary a flow rate of the gas through the upstream valve in a determined manner such that its average pressure in the cavity correlates with an average level of gas flow and such that variations in pressure in the cavity induced by varying the flow rate of gas through the upstream valve in the determined manner induce instantaneous pressure variations smaller than 30% of the average pressure in that cavity; and using the variations in the pressure in the cavity associated with varying the flow rate of gas through the upstream valve in the determined manner to determine the molecular rate of gas flow to the destination in real time.

15 Claims, 7 Drawing Sheets

(51) Int. Cl.
*G05D 7/06* (2006.01)
*G01F 1/76* (2006.01)
*G01F 1/88* (2006.01)

(58) Field of Classification Search
USPC .................................. 137/487.5, 486, 12, 14
See application file for complete search history.

(56) References Cited

U.S. PATENT DOCUMENTS

| | | | | |
|---|---|---|---|---|
| 4,384,792 | A * | 5/1983 | Sommers | G01N 11/08 |
| | | | | 374/36 |
| 5,062,446 | A * | 11/1991 | Anderson | G05D 7/0635 |
| | | | | 137/468 |
| 5,394,755 | A | 3/1995 | Sudo | |
| 5,865,205 | A * | 2/1999 | Wilmer | G05D 7/0635 |
| | | | | 137/2 |
| 5,868,159 | A | 2/1999 | Loan | |
| 5,925,829 | A | 7/1999 | Laragione | |
| 6,026,849 | A | 2/2000 | Thordarson | |
| 6,119,710 | A | 9/2000 | Brown | |
| 6,125,869 | A * | 10/2000 | Horiuchi | F16K 37/0091 |
| | | | | 137/1 |
| 6,216,726 | B1 | 4/2001 | Brown | |
| 6,363,958 | B1 | 4/2002 | Ollivier | |
| 6,450,200 | B1 | 9/2002 | Ollivier | |
| 6,564,825 | B2 | 5/2003 | Lowery | |
| 6,631,334 | B2 | 10/2003 | Grosshart | |
| 7,107,834 | B2 | 9/2006 | Meneghini | |
| 7,225,085 | B2 | 5/2007 | Zhang | |
| 7,243,538 | B1 | 7/2007 | Ramsesh | |
| 7,412,986 | B2 * | 8/2008 | Tison | G01F 25/0038 |
| | | | | 137/12 |
| 7,424,346 | B2 | 9/2008 | Shajii | |
| 7,424,895 | B2 | 9/2008 | Tison | |
| 7,823,436 | B2 * | 11/2010 | Monkowski | G01F 25/0038 |
| | | | | 73/1.26 |
| 7,975,558 | B2 | 7/2011 | Lee | |
| 8,010,303 | B2 | 8/2011 | Wang | |
| 8,150,553 | B2 | 4/2012 | Shajii | |
| 8,205,629 | B2 | 6/2012 | Gregor | |
| 8,240,324 | B2 | 8/2012 | Monkowski | |
| 8,265,795 | B2 | 9/2012 | Takahashi | |
| 2002/0198668 | A1 | 12/2002 | Lull | |
| 2003/0000578 | A1 * | 1/2003 | Lowery | G05D 7/0635 |
| | | | | 137/487.5 |
| 2004/0238040 | A1 * | 12/2004 | Furukawa | G05D 7/0635 |
| | | | | 137/487.5 |
| 2006/0236781 | A1 * | 10/2006 | Ohmi | G01F 1/42 |
| | | | | 73/861.52 |
| 2008/0035202 | A1 | 2/2008 | Lee | |
| 2008/0300802 | A1 | 12/2008 | Lakhani | |
| 2009/0143998 | A1 | 6/2009 | De Cristofaro | |
| 2010/0251828 | A1 | 10/2010 | Lee | |
| 2011/0220213 | A1 | 9/2011 | Cabrera | |
| 2012/0132291 | A1 * | 5/2012 | Monkowski | F15D 1/025 |
| | | | | 137/14 |
| 2014/0158211 | A1 * | 6/2014 | Ding | G01F 25/003 |
| | | | | 137/10 |
| 2015/0121988 | A1 * | 5/2015 | Banares | G05D 7/0635 |
| | | | | 73/1.16 |

OTHER PUBLICATIONS

"Pressure Transducers." AutomationWiki. Feb. 24, 2010. Web. Jan. 18, 2017 <http://automationwiki.com/index.php?title=Pressure_Transducers>.*
Brooks Instrument Datasheet: DS-TMF-GF135-MFC-eng.pdf, www.BrooksInstrument.com.
Horwitz, C. M., "Simple Calibrated Gas Feed System", Rev. Sci. Instrum. vol. 50, No. 5, May 1979, pp. 652-654.
Brown, Robert L. and Schwartz, James M. Pressure based mass flow control for ion implant SDS applications, Proceedings of International Conference on Ion Implantation Technology pp. 369-372, vol. 1 (1998).
J. J. Sullivan, S. Schaffer, and R. P. Jacobs, Mass flow measurement and control of low vapor pressure sources, J. Vac. Sci. Technol. A 7, (3), pp. 2387-2393 (1989.

* cited by examiner

PRESSURE-BASED GAS FLOW CONTROLLER WITH DYNAMIC SELF-CALIBRATION

CROSS-REFERENCE TO RELATED APPLICATIONS

This application claims benefit of U.S. Provisional Patent Application Ser. No. 61/785,235 filed Mar. 14, 2013, the disclosure of which is incorporated herein by reference.

FIELD

In a number of embodiments, controllers hereof are used for gas flow into chemical reactors such as vacuum process chambers, fuel systems, and combustion analysis systems. Gas flow controllers hereof may, for example, provide for construction with fewer and more economical components, yet with accuracy, reliability, and continuous self-calibration levels in advance of current technology.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Gases form part of many industrial chemical reactions, and for control of those reactions, gas flow rates must be controlled. Gas flow control differs from liquid flow control in that liquid quantities can be monitored using paddle wheels and other such mechanical volumetric displacement and velocity-measuring devices, whereas in a compressible gas the number of reactant molecules in a given volume rises as its pressure rises or as its temperature falls. Thus accurate control of gaseous chemical reactants requires some means of monitoring the flow rate of the number of gas molecules, rather than simply monitoring gas volume movements.

Many industrial processes require precise and reliable control of such molecular flow rates of gas into a reaction volume, and this is often a critical requirement. For example the manufacture of computer chips requires exacting control of reactive gases used for precise etching and deposition of fine structures on substrate surfaces. The flow rate of gas may change due to system drift, operating temperature, orientation change, line fouling, incorrect inlet pressure or defective valve operation. If such a change is not detected in time, the computer chip substrate wafers may be destroyed at a rate of one per minute until the change is discovered. Since such substrate wafers contain hundreds or thousands of computer chips, such errors quickly become extremely costly. Other uses for gas flow controllers are in combustion controls and testers, and for biological/pharmaceutical product manufacture. Gas flow control—specifically, the flow rate of gas molecules into a reaction chamber—is thus fundamental to many processes requiring precise dosing of chemical constituents.

The molecular flow rate of a gas may be measured as a "mass flow" of the gas, the mass of a volume of gas being directly proportional to the number of molecules in that volume. Some calibration standards thus use "gravimetric" techniques to monitor the rate of change of chamber weight with time as gas flows to or from the chamber.

A yet further way of describing the number of gas molecules in a volume, hence the molecular flow rate, is through a volumetric reference to some "standard" gas condition, which is typically the freezing temperature of water and sea-level atmospheric pressure. Such references to "standard" conditions are most accurate for gases which obey the Ideal Gas Law, $PV=nk_BT$, where P is the gas pressure, V the gas volume, n the number of molecules in that volume, $k_B$ is Boltzmann's constant, and T the absolute temperature of the gas. The number of molecules in a volume of gas at some other pressure and temperature is then obtained by scaling that volume to what its volume would be under "standard" conditions. In such a case, one can describe the molecular gas flow rate in units of "standard cubic centimeters per minute", "standard liters per second", and so on. If the gas behavior approximates that of an ideal gas, which conveniently applies to most gases, this "standard" volume measure is proportional to the number of molecules flowing past each second, hence is proportional to the mass flow.

Meters and controllers in common use typically display in volumetric units, but are termed "Mass Flow" Controllers ("MFCs") or Mass Flow Meters, reflecting their effective measurement of molecular flow rate. They are typically also calibrated volumetrically, with gravimetric calibration used in manufacturer checks.

Thermal sensing of gas mass flow is a popular industry method. Gas flows through a centrally heated tube and induces lower inlet and higher outlet temperatures, so the temperature difference between tube inlet and outlet is a good measure of the number of heat-transporting molecules flowing in a given time, as long as the tube is sufficiently thin and long such that most molecules participate. Such thermal sensors over time have been enhanced with software and hardware additions to address their limitations. Different molecules yield differing flow calibrations (U.S. Pat. No. 8,010,303 (Wang et al)), as do low inlet pressures, where gas thermal conduction and flow properties depart from those for high-pressure 'viscous' or 'laminar' flow. The thermal sensor tube output signal zero and readout varies with device rotation, for example from horizontal to vertical. Thermal and electronic zero drift also yield a lower limit to reliable flow readout, as do hysteresis effects at low flows due to baseplate and other heating history effects. With time, sensor tube sensitivity can vary, requiring recalibration of the sensor by either removal to a calibration stand or using added in-line calibration equipment described below. The readout in addition requires linearity adjustments. Since the small and thin sensor tubes can measure only low flows, typical flow sensing relies on 'laminar flow' bypass elements placed in parallel with the sensor tube which provide a known pressure drop, again with linearity deviations (U.S. Pat. No. 7,107,834 (Meneghini et al)). Both the sensor and laminar flow elements may clog due to fouling gases, thus yielding incorrect readouts (U.S. Pat. No. 7,243,538 (Ramsesh)). Upstream pressure fluctuation causes readout transients. An upstream pressure sensor permits readout compensations for these transients (U.S. Pat. No. 8,265,795 (Takahashi et al); U.S. Pat. No. 7,424,346 and 8,150,553 (Shajii et al)). With careful adjustments this compensation for upstream pressure changes can yield approximately constant flow readouts even in the presence of pressure jumps (Brooks Instrument Data Sheet, DS-TMF-GF135-MFC-eng, GF Series GF100/GF120/GF125 (2013)).

Gas flow control using the above thermal sensing employs a downstream proportioning valve, controlled to bring the flow readout equal to the desired flow setpoint. To check flow accuracy, a second valve may be closed on a known upstream volume with an attached pressure sensor. The rate of upstream pressure fall in that known volume yields a flow measurement for comparison with the controller readout. Such methods are described in U.S. Pat. No. 7,412,986 B2 (Tison et al); U.S. Pat. Nos. 6,363,958 B1 and 6,450,200 (Ollivier), and Brooks Instrument Data Sheet DS-TMF-GF135-MFC-eng, GF Series GF100/GF120/GF125 (2013). Since both the pressure decay and restoration of flow through the upstream valve induce upstream pressure changes with consequent possible flow variations, such check calibration is not normally done during critical process steps.

Pressure-based flow control is an open-loop control alternative to the above closed-loop sensor and control valve approach. A known pressure drop is applied across a known restrictor to yield a calculable flow rate. In its simplest form the outlet pressure is sufficiently low that it can be ignored in comparison with the upstream pressure, so that only one pressure must be monitored and controlled by an upstream valve and pressure sensor. Long capillary tube restrictors exhibit gas flow rates proportional to the square of the upstream pressure when discharging into vacuum (C. M. Horwitz, "Simple Calibrated Gas Feed System", Rev. Sci. Instrum. Vol. 50, no. 5, May 1979, pp 652-654). Choked-flow (ie, supersonic) orifices typically exhibit flow rates linearly proportional to the upstream pressure when discharging into pressures between vacuum to approximately half of the upstream pressure; see Brown, Robert L. and Schwartz, James M. Pressure based mass flow control for ion implant SDS applications, Proceedings of International Conference on Ion Implantation Technology pp. 369-372, Vol. 1 (1998); J. J. Sullivan, S. Schaffer, and R. P. Jacobs, Mass flow measurement and control of low vapor pressure sources, J. Vac. Sci. Technol. A 7, (3), pp 2387-2393 (1989); U.S. Pat. No. 6,631,334 (Grosshart) and U.S. Pat. No. 5,868,159 (Loan et al). In these controllers flow rate is simply calculated and is not monitored.

Confirmation of gas flow rate is thus required for both thermal and pressure-based controllers. Upstream methods of flow testing are described in the aforementioned Tison and Ollivier patents and the Brooks Instrument datasheet; and downstream volumetric or gravimetric methods are described in U.S. Pat. No. 7,975,558 (Lee et al) and U.S. Pat. No. 6,216,726 (Brown et al). A gas control method which eliminates the need for complex and expensive controllers and calibration systems would therefore be highly desirable. An auto-calibrating and auto-adjusting controller which can report to users its status in real time while maintaining the required flow would be a further desirable feature. A gas control method which does not require recalibration when changing between gases would simplify device stocking, calibration checking, and test, and would be a further advantage.

SUMMARY

In one aspect, a method of measuring a molecular rate of gas flow from an upstream source of gas at a pressure higher than a pressure of a destination includes flowing the gas through an upstream valve into a cavity of known volume, then through a restrictor element before proceeding to the destination, controlling the upstream valve to vary a flow rate of the gas through the upstream valve in a determined manner such that its average pressure in the cavity correlates with an average level of gas flow and such that variations in pressure in the cavity induced by varying the flow rate of gas through the upstream valve in the determined manner induce instantaneous pressure variations smaller than 30% of the average pressure in that cavity; and using the variations in the pressure in the cavity associated with varying the flow rate of gas through the upstream valve in the determined manner to determine the molecular rate of gas flow to the destination in real time. The upstream valve may, for example, be controlled to oscillate the flow rate of gas through the upstream valve between states of lower gas flow rates (sometimes referred to herein as closed states) and states of higher gas flow rates (sometimes referred to herein as open states). In a number of embodiments, the flow rate of the gas in the state of lower gas flow rate is less than five percent of the flow rate of gas in the states of higher gas flow rate.

The upstream valve may, for example be a proportioning valve which is able to controllably limit the flow rate of gas when it is placed in at least one of a series of the open states. In a number of embodiments, a rate of fall of the pressure in the cavity when the valve is in the state of lower gas flow rate is used to determine the molecular rate of gas flow to the destination.

The restrictor element may, for example, include a tube with inner diameter smaller than 4 times a length of the tube. The restrictor element may, for example, include a thin orifice plate with an effective thickness no greater than 4 times a diameter of the orifice.

In a number of embodiments, the temperature of the cavity is monitored to correct for gas density changes. The determined molecular gas flow rate may, for example, be used to dynamically update properties of the restrictor element. At least one property of the gas and configuration of the cavity selected from the group consisting of gas heat capacity ratio, cavity geometry, and the gas flow range, may, for example, be used to calculate the molecular rate of gas flow as a volumetric gas flow rate at standard conditions using at least one of isothermal and adiabatic approximations to cavity gas dynamics. The determined molecular gas flow rate to the destination may, for example, be used in a feedback loop to control the gas flow rate, and the method may further include using the upstream valve to adjust the average cavity pressure. In a number of embodiments, variations in the pressure of the source are dynamically compensated to maintain gas flow substantially independent of source pressure.

In a number of embodiments, the properties of the restrictor element are saved in a stored data file for later access. Changes in the properties of the restrictor element may, for example, be used to provide an indication of an incipient fault in the restrictor element or of an incipient fault in a component downstream from the restrictor element.

The pressure in the cavity may, for example, be monitored in real time in both an unamplified and in an ac-amplified form to a permit gross pressure readout as well as a detailed readout of variations in the pressure in the cavity. The ac-amplified pressure readout may be further processed by full-wave rectification and low-pass filtering to obtain a value for a total pressure fluctuation amplitude.

In a number of embodiments, a valve is provided either upstream from the upstream valve or in connection with the cavity for connection to a low pressure line to permit rapid removal of pressure from the cavity.

In a number of embodiments, the upstream valve may be provided with a step back drive signal to reduce valve opening hysteresis in case of nonlinear proportioning valve opening behavior.

In a number of embodiments, the flow rate of the gas through the upstream valve is varied in a determined manner such that pressure variations in the cavity yield downstream flow variations between 0.02% and 30% of the average downstream flow value. The flow rate of the gas through the upstream valve may, for example, be varied in a determined manner such that pressure variations in the cavity yield downstream flow variations between 0.1% and 10% of the average downstream flow value.

A geometry of the cavity, a connection point of a pressure sensor, and a connection tubulation of the pressure sensor may, for example, be configured to reduce detected pressure pulse transients due to variations in states of the upstream valve. In a number of embodiments, at least one of gas pulse transients and ambient vibrations is sensed by a sensor to cancel noise picked up by a pressure sensor in operative connection with the cavity. A pressure downstream of the restrictor element may, for example, be sensed via a downstream pressure sensor. The downstream pressure sensor may, for example, also be adapted to sense gas pulse transients and ambient vibrations to cancel noise picked up by a pressure sensor in operative connection with the cavity. The pressure downstream of the restrictor element may, for example, be used to improve flow calculation accuracy. The pressure downstream of the restrictor element may, for example, be used to help determine improper flow conditions.

In a number of embodiments, at least one of a zero of a pressure sensor in operative connection with the cavity and a span of the pressure sensor in operative connection with the cavity is calibrated periodically through application of a known series of one or more pressures to the pressure sensor in operative connection with the cavity.

A cavity pressure oscillation value may, for example, be amplified in an adaptive fashion with adjustable gain to improve a resolution of an oscillation waveform for digital conversion over a full range of controller flow levels. In a number of embodiments, a cavity pressure oscillation value is amplified in an adaptive fashion with adjustable gain to increase resolution of an oscillation waveform to improve response to inlet line pressure transients. A rectification and a filtering to obtain the value for the total pressure fluctuation amplitude may, for example, performed digitally by a processor. In a number of embodiments, a rate of fall of pressure in the cavity is sampled by a processor to obtain a best value of the rate of fall of pressure in the cavity in the presence of at least one of electrical noise, or sonic noise in the cavity.

In another aspect, a device for measuring a molecular rate of gas flow from a source of gas at a pressure higher than a pressure of a destination includes an upstream valve, a cavity of known volume in fluid connection with the upstream valve, a restrictor element in fluid connection with the upstream valve via the cavity, and a control system including at least one of a processor or other type of programmable device. The control system is adapted to vary the flow rate of the gas through the upstream valve in a determined manner such that an average cavity pressure correlates with an average level of gas flow rate and such that cavity pressure variations induced by varying the flow rate of gas through the upstream valve in the determined manner induce instantaneous flow variations smaller than 30% of the average level of gas flow rate to the destination. Cavity pressure variations associated with varying the flow rate of gas through the upstream valve in the determined manner are used by the processor to determine the molecular rate of gas flow in real time.

In a further aspect, a system includes a flow path for a gas from a source of gas to a destination and a device in fluid connection with the flow path. The device includes an upstream valve, a cavity of known volume in fluid connection with the upstream valve, a restrictor element in fluid connection with the upstream valve via the cavity, and a control system comprising at least one of a processor or other type of programmable device. The control system is adapted to vary a flow rate of the gas through the upstream valve in a determined manner such that an average cavity pressure correlates with an average level of gas flow rate to the destination and such that cavity pressure variations induced by varying the flow rate of gas through the upstream valve in the determined manner induce instantaneous flow variations smaller than 30% of the average level of gas flow rate to the destination. The cavity pressure variations associated with varying the flow rate of gas through the upstream valve in the determined manner are used by the processor to determine the molecular rate of gas flow in real time. The system may, for example, further include a processing chamber downstream from the device. In a number of embodiments, the processing chamber is adapted for use in the manufacture of computer chips.

An object hereof is to provide a means of gas flow control which requires a small component parts cost.

Another object hereof is a means of gas flow control providing a volumetrically calibrated flow rate substantially independent of the gas in use.

Another object hereof is a means of gas flow control providing a flow rate substantially independent of line fouling or other partial obstruction to flow, even if such fouling changes during a process run.

Another object hereof is a means of gas flow control providing an output permitting detection of line fouling or obstruction so that maintenance can be triggered at a later convenient time.

Another object hereof is a means of gas flow control providing a flow rate substantially independent of the upstream gas pressure.

Another object hereof is a means of gas flow control providing continuous calibration of the volumetric gas flow rate during its normal operation.

Another object hereof is a means of gas flow control providing flow rates to high accuracy over a wide range of flow rates.

Another object hereof is a means of gas flow control providing a flow rate substantially independent of zero and span drifts in controller hardware and sensors.

Another object hereof is a means of gas flow control providing a flow rate substantially independent of its positional orientation.

Another object hereof is a means of automated gas flow controller re-calibration without requiring removal from its environment and without the addition of additional equipment.

The new technology described here employs in one embodiment one upstream valve, a temperature sensor, and at least one pressure sensor. The hardware these devices are attached to includes a downstream flow restriction, yielding a volume between the valve and restrictor of a known geometry. High-speed oscillation of the control valve yields an oscillating pressure waveform whose amplitude yields the instantaneous flow rate using the Ideal Gas Law, with corrections if needed for the gas in use.

In a number of embodiments, devices, systems and method hereof thus yields a continuously volumetrically-calibrated flow readout substantially independent of gas type, sensor orientation, zero drift, line fouling, upstream or downstream pressure, warm-up time, and ambient temperature. This self-calibrated flow readout is used in a feedback loop to maintain flow at the desired level.

The average pressure needed to maintain a required flow is a measure of line fouling, with pressure rising as the output line becomes more blocked. Thus the user can access not only the current flow rate, but also the condition of the downstream lines and of the controller itself in real time. Consequently this new gas flow controller offers advantages over current technology for highly critical processes as well as for cost-sensitive applications.

Another embodiment hereof places a pressure sensor downstream of the restrictor to enable downstream pressure corrections to initial flow settings of this controller, enhancing its transient response and providing more information on system condition.

A further embodiment places a pressure sensor or other pressure-wave sensing device such as a microphone contiguous with the first pressure sensor, but not fluidly coupled with the first pressure sensor's gas measurement chamber. This added sensor detects and helps to compensate for ambient and internal valve-induced sound waves which could impair the precision of the first pressure sensor's measurements.

A further embodiment combines these downstream and noise-sensing sensors into one device, offering simplification yet retaining their combined advantages.

In a number of embodiments, the basic construction described herein requires only a valve, one or more pressure sensors, a storage volume, and restrictor line. These are all capable of being constructed as a single-element MEMS (micro electronic mechanical system) retaining a high precision but with an even lower cost than if individual elements were to be assembled.

These and other objects, features and advantages will become more apparent in light of the following detailed examples and drawings.

DETAILED DESCRIPTION

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely representative of embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, combinations of more than one embodiment and well known structures, materials, or operations are not shown or described in detail to avoid obfuscation.

As used herein and in the appended claims, the singular forms "a," "an", and "the" include plural references unless the context clearly dictates otherwise. Thus, for example, reference to "a restrictor" includes a plurality of such restrictors and equivalents thereof known to those skilled in the art, and so forth, and reference to "the control electronics" is a reference to one or more such control electronics and equivalents thereof known to those skilled in the art, and so forth. All methods described herein can be performed in any suitable order unless otherwise indicated herein or otherwise clearly contraindicated by the text.

Figure 1:
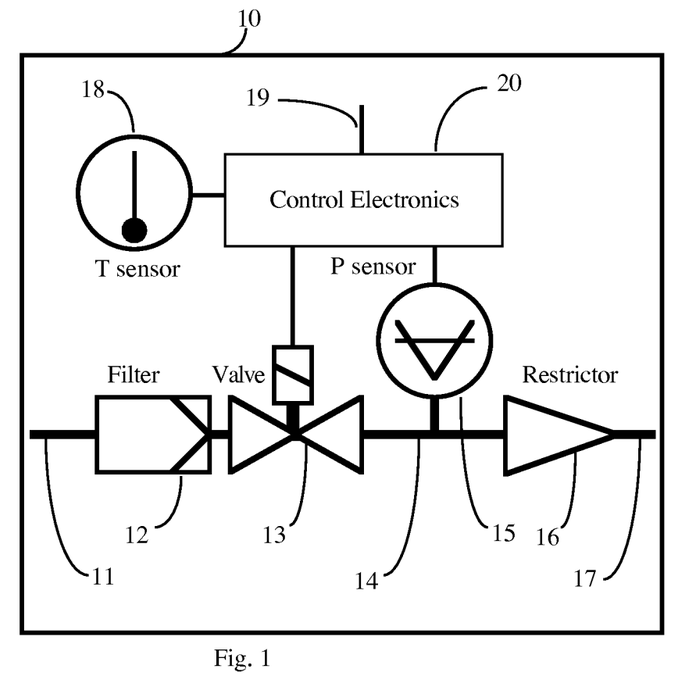
FIG. 1 shows an embodiment of a system hereof showing the components of a basic gas flow controller.

FIG. 1 shows a first embodiment 10 of a gas controller comprising an inlet 11 and outlet 17 for gas flow, and an optional filter 12 to assure particle-free conditions for the valve 13 and flow restrictor 16. The valve 13 and restrictor 16 are fluidly coupled to, and form a boundary around, an internal volume 14 which is fluidly coupled to a pressure sensor 15. A temperature sensor 18 is further attached to this internal volume 14 in such a fashion as to monitor the enclosed gas temperature. In the simplest cases this temperature sensor may be omitted and the ambient temperature estimated; or for higher accuracy it may be attached to the metalwork surrounding the volume 14. Restrictor 16 has an internal diameter smaller than that of volume 14, in order for that volume to be of a known size and separated from the downstream lines attached to outlet 17. In cases where gas temperature may differ from metalwork temperature, sensor 18 would be connected to internal elements placed inside volume 14. The valve 13, pressure sensor 15, and temperature sensor 18 are attached to control electronics 20 which is further connected on line 19 to an external control as required by the application.

Figure 2:
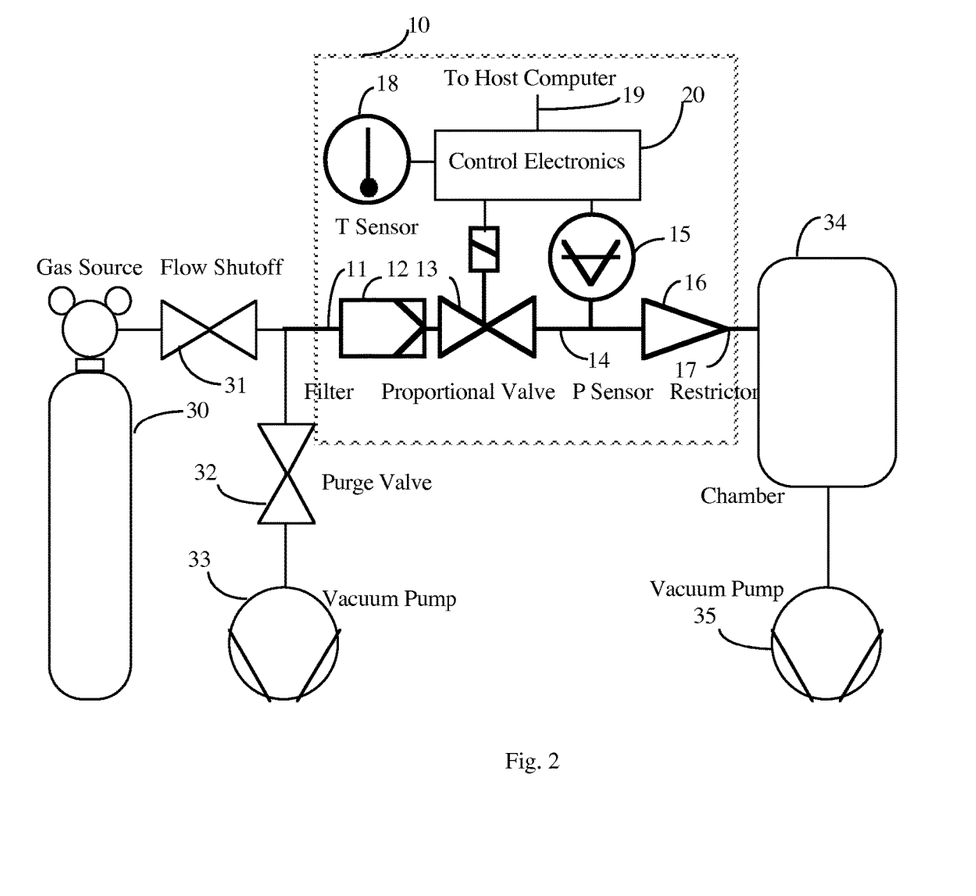
FIG. 2 shows a schematic of how such a gas flow controller may be connected to a typical semiconductor process chamber.

FIG. 2 shows how this type of gas flow controller 10 may be employed in semiconductor processing equipment. Process chamber 34 is evacuated by vacuum pump 35, which also may evacuate the flow controller internal volume 14 through gas outlet line 17 and restrictor 16, thus ensuring gas purity, and also permitting sensor 15 to have its zero level checked and re-calibrated, yielding the highest accuracy for later readout of restrictor 16's properties at the lowest flow levels. Then gas from gas source 30 is permitted into the gas flow controller input 11 by opening flow shutoff valve 31, with gas flow controlled to the level commanded by the host computer through connection line 19. Note the purity of the inlet gas is further enhanced by vacuum pump 33 connected through purge valve 32 to inlet line 11 and to flow shutoff valve 31. After initial attachment of gas source 30, the lines connecting gas source 30 to inlet 11 would be evacuated through shutoff valve 31 and purge valve 32 by pump 33. After sufficient evacuation the valves for shutoff 31 and purge 32 are closed and the gas source 30 is turned on. At the conclusion of a process run when flow shutoff valve 31 is turned off and gas flow from volume 14 to the output line 17 is not required, activating all three of purge valve 32, proportional valve 13 and vacuum pump 33 results in a quick exhaust of residual gas from volume 14, bringing gas flow rapidly to zero. At some stage during the start or end of a process, a further pressure sensor 15 calibration may be performed by permitting the process chamber pressure to rise to a known level. The resulting two-pressure re-calibration of pressure sensor 15 yields both its zero and span, and thus a complete re-calibration of the sensor's flow readings, as will be described later.

Figure 3:
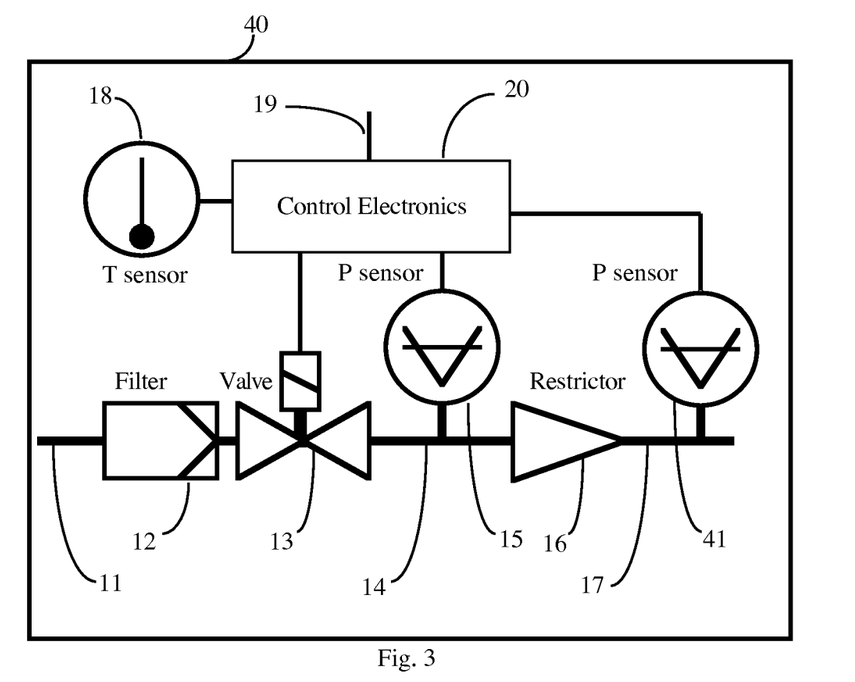
FIG. 3 shows another embodiment of a system hereof with downstream pressure monitoring.

FIG. 3 illustrates an additional pressure sensor 41 attached to the outlet line 17, forming a gas flow controller 40 which senses downstream pressures, hence the pressure differential across restrictor 16 by subtraction from the internal pressure in volume 14 as sensed by sensor 15. The downstream pressure in semiconductor processing is normally close to vacuum and can be ignored relative to the pressure in the internal volume 14. However in cases where the pressure in line 17 is sufficiently high to affect gas flow rate, the signal from sensor 41 permits control electronics 20 to set initial internal chamber 14 pressures so that the controller's response to external flow command changes yields initial flow values which require minimal additional adjustment to yield flow within setpoint values. Without knowledge of the downstream pressure from sensor 41, longer settling times to the desired setpoint and larger initial flow transients would result. Downstream sensing by sensor 41 also permits monitoring of downstream line blockage as distinct from clogging of the restrictor element 16, providing an additional system condition feedback resource.

Figure 4:
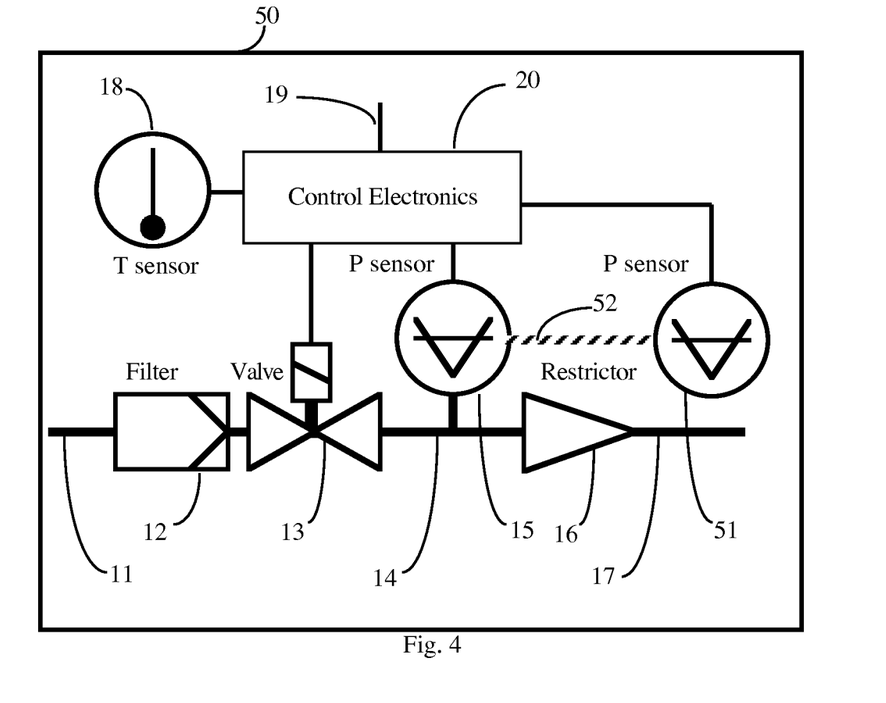
FIG. 4 shows a third embodiment of a system hereof with sound pressure wave sensing of the sensed volume ambient to enable selective pressure wave cancellation.

FIG. 4 illustrates how a pressure sensor 51 may be connected purely mechanically, as shown by the dashed line 52, to the mounting of pressure sensor 15. The result is a noise-cancelling flow controller 50. Pressure sensor 51 is not fluidly connected to internal volume 14, but instead is used as a microphone for vibrations from the controller environment. Such vibrations may arise from external sources as well as directly from proportioning valve 13, and also from gas flow transient 'hammer' noises caused by valve 13's sudden closures or openings. Being mounted so that such noise in sensor 51 is similar to the noise picked up by sensor 15, the sensor 51 signal can be subtracted from that of sensor 15 to yield a more accurate pressure waveform for the internal volume 14.

It will be appreciated that combining the attributes of sensors 41 and 51 affords clear advantages, yielding both the advantages of noise cancellation and downstream pressure monitoring in one sensor. Thus a merged form of the flow controllers shown in FIGS. 3 and 4 forms a further embodiment.

Figure 5:
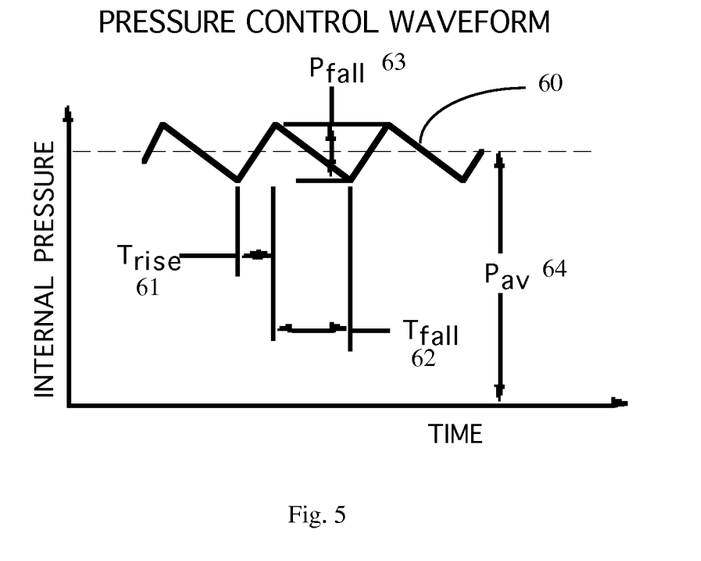
FIG. 5 shows a typical internal volume pressure waveform which enables calibrated flow control.

FIG. 5 shows an exemplary pressure waveform 60 from sensor 15 of the internal volume 14 during steady-state gas flow control. When proportioning valve 13 is opened by a controlled amount during a rise time $T_{rise}$ (61) the pressure 60 rises a small amount above the average pressure $P_{av}$ (64). A high speed proportioning valve is employed to limit pressure rise so that the overall pressure fluctuation $P_{fall}$ (63) is small compared to $P_{av}$. In FIG. 5 is shown a relatively large pressure fluctuation for illustration purposes, larger than would be desirable if flow oscillations are to be limited. With good proportioning valve performance, low system noise, and high electronic sensitivity, $P_{fall}$ can be maintained at less than 1% of $P_{av}$. During time $T_{fall}$ (62) in which proportioning valve 15 is off, the pressure in volume 14 falls at a rate linearly proportional to gas flow, thus yielding a volumetric calibration of the instantaneous gas flow rate with every cycle of valve 15. Simultaneously, the value of $P_{av}$ (64) is a measure of the total restriction to flow from volume 14 to the final gas sink provided by vacuum pump 35, yielding a real-time monitor of line fouling if this pressure is seen to rise above the expected value for restrictor 16 at the current gas flow rate.

Gas flow is calculated from the pressure-fall waveform shown in FIG. 5 using well-known gas laws, with adjustments to compensate for pressure and temperature being different from 'standard' temperature and pressure conditions. The temperature correction is applied using sensor 18, scaled to output in absolute temperature. The pressure readout requires further scaling as to be described. The flow regime used in a number of embodiments hereof spans two extremes for gas oscillation; isothermal and adiabatic. The calibration in practice will be intermediate, depending on oscillation frequency and the internal volume geometry.

If the incoming gas equilibrates rapidly with the temperature of internal volume 14 such that the falling pressure waveform $P_{fall}$ 63 is executed at substantially constant temperature, the isothermal approximation applies. For example, at the lowest flows in a calibrated flow controller's range, the rate of pressure decay may be of the order of several seconds, yielding gas temperature stability and hence isothermal conditions.

For the most rapid waveforms at high gas flow rates, temperature equilibration between gas and internal volume 14 does not occur, so adiabatic conditions apply. The calibration ratio between these two extreme cases is typically 0.67, yielding at most a 30% difference in calculated flow for those two modes. Thus controller electronic control 20 should transition its calculation mode from adiabatic to isothermal as gas flow rate falls, in a fashion which depends on the configuration of internal volume 14 and the gas flow range in use.

Isothermal Approximation

Initially assume isothermal pressure and temperature fluctuations. The number of ideal gas molecules n filling the internal volume $V_i$ (14) is derived from:

$$[nk_B]=[PV_i]/T, \text{ where}$$

P is the pressure at absolute gas temperature T, and $k_B$ the Boltzmann constant.

The 'sccm' (standard cubic centimeter per minute) volumetric flow unit is generally based upon the IUPAC "STP" (Standard Temperature and Pressure) standard gas conditions of $T_0$=273.15 K (0° C.) temperature and $P_0$=100 kPa (0.986 bar) pressure, so is a measure of the number of molecules $n_0$ in volume $V_i$ under 'standard' conditions:

$$[n_0 k_B]=[P_0 V_i]/T_0;$$

hence the number of molecules relative to standard conditions is:

$$[n/n_0]=[P\ T_0]/[P_0 T].$$

An isothermal pressure change ΔP in volume $V_i$ over time Δt is caused by a 'mass flow rate' Q, proportional to the number of molecules flowing per unit time [hence not strictly a mass, but rather a molecular flow rate], and also yielding the required temperature correction to flow readings due to lowered gas density as ambient temperature rises:

$$Q = -[\Delta P T_0 V_i]/[P_0 T \Delta t], \text{ for falling pressure,}$$

$$= -[T_0/P_0][V_i/T][\Delta P/\Delta t] \text{ for isothermal 'mass' flow at STP.}$$

The above formula has been extensively used as a primary measurement standard; for example see U.S. Pat. No. 7,225,085 (Zhang et al) and U.S. Pat. No. 5,925,829 (Laragione et al).

Mass Flow Controller (MFC) calibration and verification in situ may employ this formula set with an upstream valved volume with pressure regulation to permit valved volume pressure changes without sudden MFC inlet pressure variations; see U.S. Pat. No. 6,363,958 (Ollivier), U.S. Pat. No. 6,450,200 (Ollivier), U.S. Pat. No. 7,823,436 (Monkowski et al), U.S. Pat. No. 8,240,324 (Monkowski et al), U.S. Pat. No. 5,394,755 (Sudo et al).

Alternatively a downstream valved volume with a similar pressure change measurement may be used with this formula set to check flow; for example see U.S. Pat. No. 7,412,986 (Tison et al), U.S. Pat. No. 7,424,895 (Tison et al), U.S. Pat. No. 7,975,558 (Lee et al), U.S. Pat. No. 8,205,629 (Gegor et al), US 2008/0035202 (Lee et al), US 2010/0251828 (Lee et al).

This isothermal formula, rather than being used merely for flow controller calibration, also forms the basis of flow sensors and controllers based upon the rate of pressure fall of a volume connected to a flow restrictor; see U.S. Pat. No. 4,285,245 (Kennedy), U.S. Pat. No. 6,119,710 (Brown), U.S. Pat. No. 6,216,726 (Brown et al), U.S. Pat. No. 4,364,413 (Bersin et al).

Adiabatic Approximation

Under the opposite extreme condition of adiabatic high-speed pressure and temperature fluctuations, the flowing gas does not equilibrate with internal volume 14. During a pressure ramp with initial and final pressures $P_1$, $P_2$, temperatures $T_1$, $T_2$, and defining the ratio of heat capacities $k=C_p/C_v$, a slug of gas in the internal volume exhibits a temperature ratio; $[T_2/T_1]=[P_2/P_1]^{[(k-1)/k]}$. The number of molecules in volume V is proportional to P/T from the ideal gas law, so the ratio of molecule numbers n in the two cases is $[n_2/n_1]=[P_2\ T_1]/[P_1\ T_2]=[P_2/P_1]^{[1/k]}$. Diatomic molecule values for [1/k] are around 0.7; monatomic [1/k] values are 0.6 (see for example http://en.wikipedia.org/wiki/Heat_capacity_ratio).

Thus for small pressure and temperature changes such as envisaged here, $$dn/dP \approx [1/k][n/P].$$

The adiabatic 'mass' flow rate Q is thus a factor of $[1/k] \approx 2/3$ of isothermal flow values;

$$Q \approx [1/k][V/T][dP/dt].$$

With the Standard Temperature and Pressure (STP) correction applied, falling pressure in the internal volume $V_i$ 14 yields:

$$Q \approx -[1/k][T_0/P_0][V_i/T][dP/dt] \text{ for adiabatic 'mass' flow.}$$

Commanded Flow Fall Response

The internal volume $V_i$ (14) must be emptied if a flow reduction is required. Rapid dump of this pressure may be achieved through inlet proportioning valve 13 and upstream purge valve 32, or through a separate purge valve and purge connection in the internal volume 14, if optionally provided.

Flow through the restrictor will also fall to zero with proportioning valve 13 off. Here we consider the time taken for flow to fall in this type of controller assuming an internal volume 14 $V_i$=0.05 cc, maximum flow $Q_m$=3 sccm at its internal maximum pressure $P_m$=1 atmosphere feeding into vacuum. For a thin orifice restrictor 16 operating with ultrasonic downstream flow velocity, such a choked flow orifice restrictor has a linear Q vs. P law except for the lowest P values, the rate of internal pressure change is thus $$dP/dt = -P\ Q_m/[P_m V_i];$$

hence an exponential pressure fall from initial pressure $P_0$ results:

$$P = P_0 \exp[-tQ_m/(P_m V_i)].$$

At 2.3 seconds P, hence flow, will have fallen by a factor of 10, and at 4.6 seconds by 100, at least until restrictor pressure difference between volume 14 and output 17 reaches its nonlinear region. For a long tube with small internal diameter, such a tubular flow restrictor has a quadratic Q vs. P law except for the lowest P values. Its rate of internal pressure change is then $$dP/dt = -P^2 Q_m/[P_m^2 V_i];$$

hence a hyperbolic pressure fall from initial pressure $P_0$ results:

$$P^{-1} = P_0^{-1}[tQ_m/(P_m^2 V_i)].$$

For $Q_0$=3 sccm, after 2 seconds Q will have fallen by a factor of 10, and at 9 seconds by 100.

Hence starting from full-scale flow, both restrictor types yield similar fall times to 1/10 of full-scale but thereafter the tubular/capillary line type falls more slowly than the choked-flow thin orifice type, yielding an advantage to orifice restrictors. It will be seen in the FIG. 6 discussion that choked-flow orifices have the competing disadvantage of lower restrictor property feedback accuracy than do tubular flow restrictors in the low-flow regime. In addition orifices are usually smaller, hence more easily clogged or eroded, than are tubular restrictors. Thus the highest-performance flow control over a wide range of flows may in general be attained using tubular flow restrictors combined with upstream purging of internal volume 14.

Figure 6:
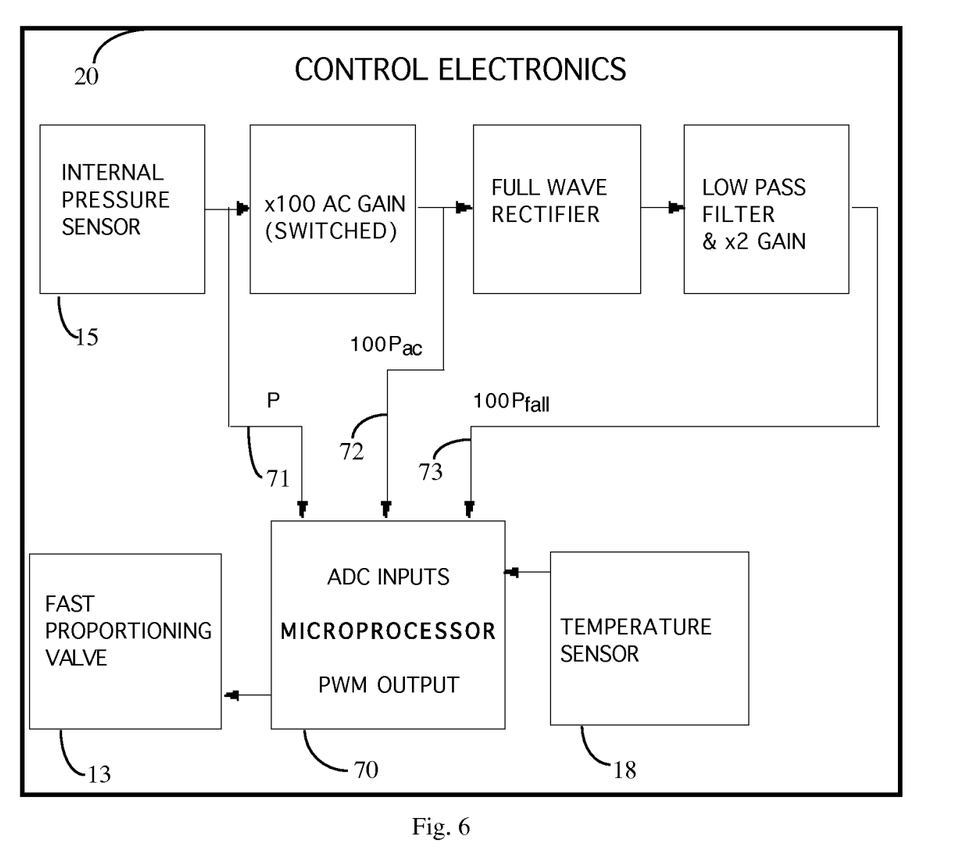
FIG. 6 shows an embodiment of control electronics to enable high precision flow control over a wide flow range.

FIG. 6 is a block diagram of Control Electronics 20 operation for the embodiment shown in FIGS. 1 and 2. Pressure sensor 15 signal is amplified and presented to microprocessor 70 together with temperature sensor 18's amplified output. The microprocessor calculates the instantaneous flow rate and thus determines any changes, if needed, to the drive required on the fast proportional valve 13, both in the length of its 'on' time $T_{rise}$ (61) and in valve drive power level from a Pulse Width Modulated (PWM) output from the microprocessor. Using its continuous calculation of gas flow rate from the rate of pressure fall $P_{fall}$ (63) during time $T_{fall}$ (62), microprocessor 70 is able to adjust its drive to proportioning valve 13 such that average pressure $P_{av}$ (64) on signal line 71 yields the desired gas flow rate through restrictor 16 and the lines further downstream.

Other blocks shown in FIG. 6 provide further signal processing of the pressure signal; firstly with ac amplification of the pressure signal to attain a high-level waveform 72 of the $P_{fall}$ (60) signal without the $P_{av}$ (64) level included; and secondly a further-processed signal 73 yielding the value of $P_{fall}$ (63) directly.

With modern signal-processing techniques such as Digital Signal Processing using Boxcar Averaging, Digital Filtering, and switched-gain amplifiers, the exemplary boxes shown in FIG. 6 would vary, with some also being included in microprocessor 70's internal operations. For example, the derivation of signal 73 from signal 72 would be done inside the microprocessor through its selection of time-stamped pressure values from the real-time waveform 72 at times which avoid transients due to incoming gas flow shock noise at valve on/off actuation times, followed by digital subtraction of those pressure values and digital division by their time difference to yield the rate of pressure fall. Thus the microprocessor selects pressure values inside the $T_{fall}$ (62) period which are relatively noise-free in order to make the most accurate flow calculation.

Inclusion of additional sensors for the embodiments using additional pressure sensing shown in FIGS. 3 and 4 would require similar additional microprocessor and amplifier blocks, with ac amplification of low-level noise riding on the higher-level average pressure values, and signal processing blocks for the appropriate measurement and subtraction of signals.

For many industrial processes, not only the average flow must be constant but also the short-term flow value should be constant. Since a number of embodiments hereof propose a constantly varying flow about a constant average, such variations must be held to acceptable levels for each application. In cases where our controlled gas flow goes into a large process chamber with long gas residence time, short term flow variations will be averaged out in the process chamber volume. Short process chamber gas residence times conversely require closer short-term adherence to the desired flow value.

The requirements for average flow accuracy and small flow ripple implies constraints upon design of the control electronics 20 blocks. For example, to attain an accuracy of 0.1% of average flow while operating close to the full-scale flow range of a controller in a number of embodiments hereof, and assuming a permitted flow ripple of 1%, the pressure-drop level $P_{fall}$ (63) must be resolved to an accuracy of (for a linear-response choked-flow restrictor) 1 part in 100,000. Thus each individual pressure reading must be read accurately within 5 parts in a million. For a tubular capillary restrictor with quadratic dependence of flow on pressure, the readings must be accurate to 2.5 parts per million.

Such precisions could be attained with (respectively) 18- or 19-bit Analog to Digital Conversion (ADC) devices in the absence of ambient and inherent electrical noise sources, but with great difficulty. Since the desired flow accuracy must be maintained at lower flows than the full scale value, for example to 10% of full scale, the required precision rises by a further factor of 10 for orifice restrictors, or 3 for capillary restrictors. Thus it is more practical to use lower-precision ADCs combined with ac amplification of the steady-state pressure signal P (71), since only the variation in pressure, and not its steady value, must be resolved to high accuracy to attain high flow accuracy. Assume that, while operating at full-scale flow, the pressure fluctuations in pressure signal P (71) are amplified by a further factor of 100 to obtain the $100P_{ac}$ (72) signal into microprocessor 70. With allowable fluctuations of 1% in flow, an orifice restrictor will exhibit a waveform 72 spanning across the extremes of amplifier output, and a tubular capillary restrictor waveform will be half of that size. Thus attainment of 0.1% flow accuracy requires ADC resolution of, respectively, 11 and 13 bits. If the ac amplifier block is further designed to have adjustable switched gains permitting the waveform to completely fill to the extremes of amplifier output, the maximum resolution required becomes respectively 11 and 12 bits. These resolutions are readily attained in typical microprocessors and ADC chips, yielding the required accuracy in an economic fashion. The adjustable switched gain would rise to 2000 for a tubular capillary restrictor at 10% of full scale flow, all the while retaining an excellent flow accuracy of 0.1% of flow, hence an accuracy of 0.01% of full-scale flow.

It is further desirable to insert an additional ac pressure input to microprocessor 70, scaled to yield a less-highly amplified pressure transient waveform than is provided on line 72 so that short-term unexpected changes in the waveform can be adequately responded to. Thus there could be an additional switched ac pressure amplification stage and an additional ADC input to the microprocessor to achieve this goal. Alternatively a nonlinear amplification stage, with compressed gain at high input signal levels, may be used either to replace the stage driving line 72, or separately from it. All of these measures, either separately or in combination, would yield the ability to respond appropriately to inlet pressure transients as will be discussed in the context of FIG. 7.

In comparison with the above stringent accuracies required of pressure measurements, the pressure drop value is to be divided by $T_{fall}$ (62) to obtain a flow value. However timing is controlled with extreme crystal-clock precision in the microprocessor 70, and can be assumed to not add to the above uncertainties in the final result.

Since flow into the internal measurement volume $V_i$ (14) is pulsatile, sonic waves reflect and cause ripples in the ideal waveforms shown in FIG. 5. For a typical 50 mm cavity length the characteristic time between such reflections is approximately 0.3 ms for air at STP (Standard Temperature and Pressure), yielding a possible cavity resonance. In addition, rapid movement of the valve 13 actuator, and the pressure differential across its actuator, cause sudden jets of gas and other pressure extremes in its direct downstream line of sight. Such sources of noise on the pressure sensor 15 can be reduced through at least one of the measures of; slow opening and closing of the proportioning valve, gas flow and sonic wave damping structures in internal volume 14, positioning of pressure sensor 15 to avoid line-of-sight exposure to the direct gas flows from proportioning valve 13, and connection of sensor 15 into internal volume 14 using appropriately sized tubulation. In cases where the waves cannot be sufficiently damped using the above measures due to volume or response time constraints, single time-stamped pressure fall measurements may be less accurate than filtered values which compensate for this cavity resonance and other noise sources.

Flow oscillation timing is a further important feature of gas control, and here is controlled by internal volume 14 and the desired flow rate. For isothermal conditions the flow rate of gas is, in sccm ('standard cubic centimeters per minute');

$$Q(\text{sccm}) = [P_i - P_f] * V_i / [t_f - t_i] = P_{fall} / T_{fall}, \text{ where}$$

$P_f$ and $P_i$ are the final and initial pressures (here in standard atmospheres, or 'bars'), corrected for their values at standard temperature;

$V_i$ is internal chamber volume 14 (here in cc);

$t_f$ and $t_i$ are the initial and final times, (here in minutes).

For a 0.05 cc internal volume 14 ($V_i$)) and at a maximum rated flow $Q_{max}$=3 sccm, a tubular capillary restrictor, and $P_{max}$=1 atmosphere, the time $P_{fall}$ (63) for pressure P to fall by 1% of its steady value is 10 ms. This would yield a flow sawtooth of 2% total variation and 13 ms period, using a proportioning valve that partially opens for 3 ms each cycle. If operating at ¹⁄₁₀ of that maximum flow, using a capillary line restrictor with square-law pressure dependence, the corresponding period for 1% pressure and 2% peak-to-peak flow variation is 33 ms, with $P_{fall}$ (63)=30 ms. These timescales are shorter than the residence time in most reaction chambers, thus yielding materially constant flow.

Thermal gas flow sensors exhibit long-term and ambient temperature drift in zero levels which makes low flow measurement difficult. These zero levels also change with device orientation. Pressure sensor zero drift affects the average pressure reading P (71), hence the apparent flow impedance of the restrictor and downstream lines. At low flows where values of P may become comparable with pressure sensor zero drifts, faulty measures of restrictor 16 and downstream conditions will result until the system is auto-zeroed to compensate for sensor drift by recording a known pressure (preferably one close to vacuum in comparison with typical values of P (71) in use) in volume 14 at the end of a process run. Thereafter, readings of these downstream conditions will become more accurate until further uncompensated drift occurs.

Happily, pressure sensor zero drift has no effect on gas flow rate in the devices, systems and methods hereof since zero drift has no effect on the small-signal $P_{ac}$ (72) oscillating waveform used for flow sensing. Thus the required flow for a process will be maintained at normal system accuracy independent of pressure sensor zero drift, even if it occurs during a process run. Sensors may however also exhibit 'span' drift, wherein their basic sensitivity is affected. Flow measurement in a number of embodiments of systems hereof is directly proportional to sensor span, and span drift can be compensated for exactly as zero drift is removed above, by recording a second known pressure in volume 14 at the end of a process run. The combination of two known pressure readings yields both sensor zero and span calibrations.

It will be noted that devices, systems and methods hereof provide, through the above periodic checks of its pressure sensor and monitoring of its restrictor conditions, complete automated in-situ recalibration and certification of its own accuracy. Such auto-calibration is not available from thermal flow sensors or from pressure-based open-loop flow devices. The only factor that can affect the accuracy of controllers in a number of embodiments hereof is fouling of internal volume 14 such that its volume is reduced, resulting in a flow readout higher than the true flow, and so causing pressure P (71) to be lower than it should be for a normal restrictor 16, and thus in a gas flow lower than desired. In such a case however, restrictor 16, which is of necessity a smaller diameter than internal volume 14, would foul more rapidly, requiring higher pressure than is normal for the desired flow, and thus provides early warning of later flow errors.

System Monitoring

The microprocessor 70 further has the capability in its internal or externally attached memory to store its auto-calibration history. Thus its record of any required compensations to original settings can be downloaded for system analysis. This record is further able to be time-stamped with an inbuilt real-time clock with battery backup and supplemental data storage. Such real-time-stamped storage capabilities are common in the industry and can be achieved either internally to the microprocessor using a battery backup power unit, or with an external real-time chip module. Such modules commonly include memory so that both time and data are recordable with full battery backup. Since the amplified pressure variation signal 72 is a measure of flow, and the basic pressure signal 71 is a measure of total line restriction, typical data logs would include time, temperature, pressure signal 71, and the instantaneous flow request value and the resultant actual flow value. In cases where other sensors are used such as downstream pressure sensor 41, its value would also be included in the stored data.

If a flow restrictor is becoming blocked it can be taken out of service before a processing problem ensues. For this purpose, the microprocessor 70 can be instructed to flag any auto-calibration compensations which are outside a desired user-allocated band of acceptability. This affords early and pre-emptive maintenance warnings, while maintaining full rated flow accuracy.

Figure 7:
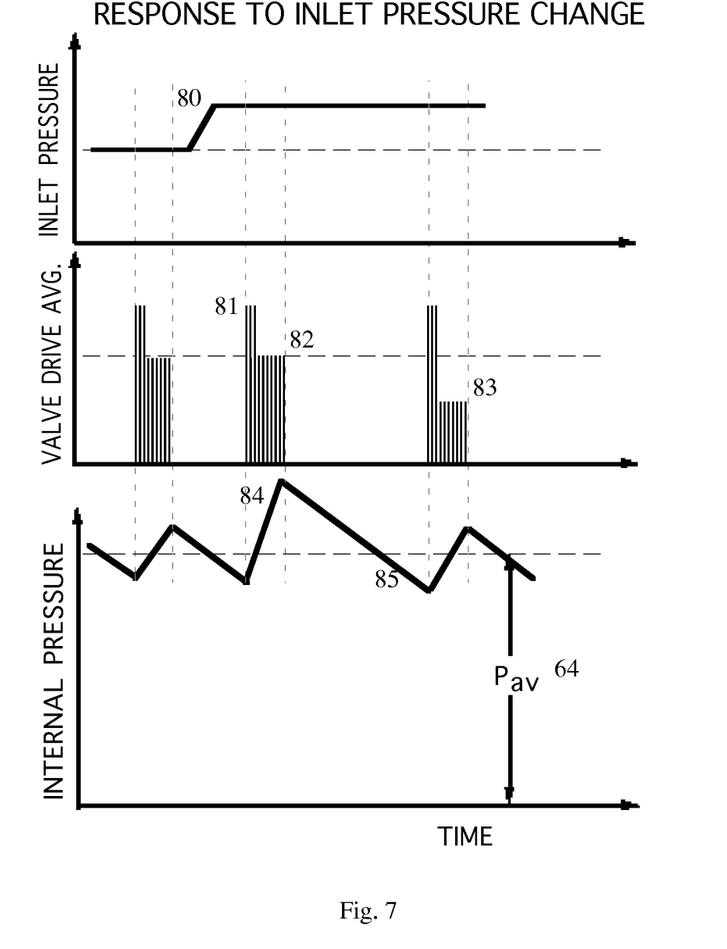
FIG. 7 shows how inlet gas pressure transients may be responded to in this type of gas flow controller.

FIG. 7 illustrates the effect of input pressure transients 80 on flow controller operations. At the noted point 80, inlet pressure on line 11 rises. Before that point and immediately after, the waveforms 81 and 82 impressed upon the fast proportioning valve 13 are identical. The initial power burst 81 of valve drive may be required to move the valve plunger off its seat in a timely fashion, and to counteract the force due to pressure differential from line 11 to internal volume 14 across the valve when it is shut. However this high drive level would yield excessively large gas bursts into internal volume 14, so drive is reduced to level 82 for the remainder of its 'on' time $T_{rise}$ (61). The pressures observed in internal chamber 14 rise during the second valve drive pulse to a higher level 84 than was expected because of the pressure transient 80, resulting in a momentary increase in the output flow. Upon return of internal volume 14 pressure to the regular low point for valve switching 85, or to a lower point to compensate for the prior momentary rise in flow rate, the valve is again powered with a signal at the valve's 'turn on' level 81, then at a lower value 83 to yield a rate of pressure rise closer to the prior value, thus maintaining the required value of $P_{av}$ (64), hence a constant gas flow.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of volumetrically measuring and controlling an average molecular rate of gas flow from an upstream source of gas having a pressure higher than a pressure of a destination for the gas, comprising:

flowing the gas through an upstream valve into a cavity of known volume, then through a restrictor element before proceeding to the destination, controlling the upstream valve via control electronics to repeatedly vary the flow rate of gas from the upstream source through the upstream valve in a determined oscillatory manner between a state of higher gas flow rates and a state of lower gas flow rates such that the gas flow rate through the upstream valve in the state of lower gas flow rates is no more than five percent of the gas flow rate in the state of higher gas flow rates, wherein the upstream valve is the only valve controlled via the control electronics between the upstream source of gas and the destination for the gas while volumetrically measuring and controlling the average molecular rate of gas flow to the destination which permits the downstream gas flow rate to the destination to vary within process-compatible limits around the average molecular rate of gas flow in a repeated oscillatory manner;

controlling the upstream valve such that an average pressure in the cavity correlates with an average level of the gas flow rate;

controlling the upstream valve such that variations in pressure in the cavity induced by varying the flow rate of gas through the upstream valve in the determined manner induce instantaneous pressure variations smaller than 30% of the average pressure in the cavity;

monitoring a temperature in the cavity using a temperature sensing element to enable correction for gas density changes; and calculating the molecular rate of gas flow to the destination in real time when the upstream valve is in the state of lower gas flow rates using a rate of fall of pressure in the cavity to control the molecular rate of gas flow to the destination.

2. The method of claim 1 in which the restrictor element comprises a tube with inner diameter smaller than 4 times a length of the tube.

3. The method of claim 1 in which the restrictor element comprises a thin orifice plate with an effective thickness no greater than 4 times a diameter of the orifice.

4. The method of claim 1 in which at least one property selected from the group consisting of gas heat capacity ratio, cavity geometry, and a range of gas flow rates, is used to calculate the molecular rate of gas flow as a volumetric gas flow rate at standard conditions using at least one of isothermal and adiabatic approximations to cavity gas dynamics.

5. The method of claim 1 in which the determined molecular gas flow rate is used to dynamically update properties of the restrictor element stored in a data file of the control electronics to improve at least one of; average gas flow rate sensing, indication of an incipient fault in the restrictor element, and indication of an incipient fault in a component downstream of the restrictor element.

6. The method of claim 1 in which the pressure in the cavity is monitored in real time in both a gross form to yield a gross average pressure readout and a derived average gas flow readout, and also in a detailed form to yield a detailed readout of cavity pressure variations.

7. The method of claim 1 in which a second valve is provided either upstream from the upstream valve or in connection with the cavity for connection to a low pressure line to permit rapid removal of pressure from the cavity.

8. The method of claim 1 in which the process-compatible limits of downstream flow variations are between 0.02% and 30% of an average downstream flow rate.

9. The method of claim 1 in which the process-compatible limits of downstream flow variations are between 0.1% and 10% of the average downstream flow rate.

10. The method of claim 1 wherein detected pressure transients are controlled via at least one of a sonic wave dampening structure in the cavity, positioning a pressure sensor to avoid line-of-sight alignment with direct gas flow from the upstream valve, and control of the speed of opening and the closing upstream valve.

11. The method of claim 1 in which a pressure downstream of the restrictor element is sensed via a downstream pressure sensor and wherein the downstream pressure sensor is employed to improve at least one of flow calculation accuracy, noise cancellation, and sensing of improper flow conditions.

12. The method of claim 1 in which periodic absolute calibration of the gas flow system is attained through application of a known series of one or more pressures to a pressure sensor in operative connection with the cavity to determine at least one of a zero and or a span setting of the pressure sensor.

13. A device for volumetrically measuring and controlling a molecular rate of gas flow from a source of gas at a pressure higher than a pressure of a destination, comprising: an upstream valve, a cavity of known volume in fluid connection with the upstream valve, a restrictor element in fluid connection with the upstream valve via the cavity, and a control system comprising at least one of a processor or other type of programmable device, the control system being adapted to repeatedly vary the flow rate of the gas through the upstream valve in a determined manner such that an average pressure in the cavity is used to monitor gas flow rate and such that pressure variations in the cavity induced by varying the flow rate of gas through the upstream valve in the determined manner induce instantaneous flow variations smaller than 30% of an average level of gas flow rate to the destination, wherein pressure variations in the cavity associated with varying the flow rate of gas through the upstream valve in the determined manner are used by the processor or other type of programmable device to volumetrically measure and control the average molecular rate of gas flow during repeated oscillatory gas flow rate variations to the destination in real time, wherein the upstream valve is the only valve controlled via the control system between the upstream source of gas and the destination for the gas to volumetrically measure and control the average molecular rate of gas flow to the destination which permits the molecular rate of gas flow to the destination to vary within process-compatible limits around the average molecular rate of gas flow in an oscillatory manner.

14. A system comprising a flow path for a gas from a source of gas to a destination, the system comprising: a device in fluid connection with the flow path, the device comprising an upstream valve, a cavity of known volume in fluid connection with the upstream valve, a restrictor element in fluid connection with the upstream valve via the cavity, and a control system comprising at least one of a processor or other type of programmable device, the control system being adapted to repeatedly vary a flow rate of the gas through the upstream valve in a determined manner such that an average pressure in the cavity is used to monitor gas flow rate to the destination and such that-pressure variations in the cavity induced by varying the flow rate of gas through the upstream valve in the determined manner induce instantaneous flow variations smaller than 30% of an average level of gas flow rate to the destination, wherein pressure variations in the cavity associated with varying the flow rate of gas through the upstream valve in the determined manner are used by the processor or other programmable device to volumetrically measure and control the average molecular rate of gas flow in the presence of oscillatory gas flow rate variations to the destination in real time, wherein the upstream valve is the only valve controlled via the control system between the upstream source of gas and the destination for the gas to volumetrically measure and control the average molecular rate of gas flow to the destination which permits the molecular rate of gas flow to the destination to vary within process-compatible limits around the average molecular rate of gas flow in an oscillatory manner.

15. The system of claim 14 wherein the system further comprises a processing chamber downstream from the device adapted for use in the manufacture of computer chips.

* * * * *